US012022172B2

(12) United States Patent
Borg et al.

(10) Patent No.: US 12,022,172 B2
(45) Date of Patent: Jun. 25, 2024

(54) METHODS AND APPARATUS FOR MULTI-SPECTRAL IMAGING PYROMETER UTILIZING TUNABLE OPTICS

(71) Applicant: UNITED STATES OF AMERICA AS REPRESENTED BY THE ADMINISTRATOR OF NASA, Washington, DC (US)

(72) Inventors: Stephen E. Borg, Williamsburg, VA (US); Hyun Jung Kim, Yorktown, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 0 days.

(21) Appl. No.: 17/723,675

(22) Filed: Apr. 19, 2022

(65) Prior Publication Data
US 2023/0336846 A1    Oct. 19, 2023

(51) Int. Cl.
*H04N 23/11* (2023.01)
*G01J 5/08* (2022.01)
*G02F 1/21* (2006.01)
*G06T 5/50* (2006.01)
(Continued)

(52) U.S. Cl.
CPC ............ *H04N 23/11* (2023.01); *G01J 5/0859* (2013.01); *G02F 1/213* (2021.01); *G06T 5/50* (2013.01); *G06T 5/92* (2024.01); *G01J 2005/0077* (2013.01); *G06T 2207/10048* (2013.01);
(Continued)

(58) Field of Classification Search
None
See application file for complete search history.

(56) References Cited

U.S. PATENT DOCUMENTS

| 4,687,344 A | 8/1987 | Lillquist |
| 5,180,921 A | 1/1993 | Moreau et al. |
(Continued)

FOREIGN PATENT DOCUMENTS

| EP | 3742136 A1 | * | 11/2020 | ............. G01J 5/00 |
| WO | WO-0173384 A1 | * | 10/2001 | ............. G01J 5/60 |

OTHER PUBLICATIONS

English translation of EP-3742136 A1, Kroll, Nov. 2020 (Year: 2020).*

*Primary Examiner* — James M Hannett
(74) *Attorney, Agent, or Firm* — Matthew R. Osenga; Robin W. Edwards; Trent J. Roche

(57) ABSTRACT

A multi-spectral imaging system utilizing tunable optics is disclosed. Various disclosed systems include a tunable optical filter coupled to a broadband imaging system. The tunable optical filter allows discrete infrared wavelengths to pass to the broadband imaging system so that monochromatic infrared images of a scene may be captured. An image processing system may process selected monochromatic infrared images by using a ratio technique to generate an emissivity-independent thermal image of the scene. The tunable optical filter may also be used to adjust a quality factor and control an amount of radiated energy that is passed to an image sensor of the broadband imaging system thereby acting as an aperture to account for both low and high radiance portions of the scene.

17 Claims, 6 Drawing Sheets
(2 of 6 Drawing Sheet(s) Filed in Color)

(51) Int. Cl.
*G06T 5/92* (2024.01)
*G01J 5/00* (2022.01)

(52) U.S. Cl.
CPC ............... *G06T 2207/20208* (2013.01); *G06T 2207/20221* (2013.01)

(56) References Cited

U.S. PATENT DOCUMENTS

| | | | | |
|---|---|---|---|---|
| 5,225,883 | A * | 7/1993 | Carter | G01J 5/0014 374/124 |
| 5,488,226 | A * | 1/1996 | Iafrate | H10N 19/00 257/E27.008 |
| 5,963,311 | A * | 10/1999 | Craig | G01J 5/48 356/43 |
| 6,682,216 | B1 * | 1/2004 | Small, IV | G01J 5/0805 374/126 |
| 11,320,647 | B2 * | 5/2022 | Chou | G02B 27/0955 |
| 2007/0187604 | A1 * | 8/2007 | Bandara | H01L 27/14652 257/E31.022 |
| 2019/0235228 | A1 * | 8/2019 | Chou | G02F 1/0147 |

* cited by examiner

METHODS AND APPARATUS FOR MULTI-SPECTRAL IMAGING PYROMETER UTILIZING TUNABLE OPTICS

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND

Accuracy of current radiometrically calibrated imaging systems is affected by emissivity variations within the field-of-view. There is no way to provide automatic, independent, emissivity-based temperature corrections at the pixel level, for cameras that operate with broadband detectors. Multiwavelength pyrometric systems can make emissivity-corrected temperature measurements, but they are not imaging devices and lack the ability to view surface gradients and other subtle variations in the field of view. For best results, their usage is restricted to applications with uniform temperature profiles within their field-of-view. Data is basically a point measurement and displayed as either and average or peak value.

Current radiometric infrared imaging systems utilize fixed aperture optics and vary the sensor integration timing to achieve higher temperature ranges. This limits the dynamic range of the temperature data the system can display for a given sensor integration time. Current optical systems that make measurements at several discrete wavelengths require the use of multiple optical filters with fixed optical properties, and are typically controlled with electromechanical devices that are slow, bulky and require high power.

For example, modern radiometric infrared cameras and pyrometers have some design elements that limit their performance, accuracy, and functionality. The radiated energy from a body due to its temperature is proportional to temperature at a rate of $T^4$, meaning that a doubling in temperature yields a 16-fold increase in radiation output. Current radiometric cameras use fixed-aperture optics and are calibrated using specific detector pixel integration times to extract temperature data from scene radiosity. Because detectors have limited bandwidth and pixel full-well capacities, to expand the min/max temperature range that can be measured, it is necessary to vary the detector pixel integration times to prevent data loss due to saturation/underfilling of the electron wells.

Modern radiometric infrared imaging cameras also rely on estimations of the target emissivity in order to get accurate temperature data. Spectral emissivity is a function of temperature and wavelength, and is typically the largest source of uncertainty in radiometric data. Large changes in target temperature could also result in dramatic changes in its emissivity, causing errors to propagate. Additionally, natural variations in scene emissivity can also skew results and commonly require correction by hand.

Ratio pyrometers do have the ability to correct for emissivity effects but are not true imaging devices, they usually give either averaged or peak, single-point temperature data within their field of view. There are a few imaging pyrometers that combine the benefits of a focal plane array type imaging sensor with a multi-wavelength pyrometer, but they are limited in capability. For example, in one case a multi-color pyrometer samples a fixed region within the image, then uses the emissivity compensated data from those pixels to provide a blanket correction to the rest of the image. The assumption is that the remainder of the pixels outside the pyrometer portion of the image has similar radiometric properties. This isn't usually the case in complex, real-world imagery and provides results that are less than optimal.

BRIEF SUMMARY OF THE TECHNOLOGY

A multi-spectral imaging system utilizing tunable optics according to various aspects of the present technology includes a tunable optical filter coupled to a broadband imaging system. The tunable optical filter allows discrete infrared wavelengths to pass to the broadband imaging system so that monochromatic infrared images of a scene may be captured. An image processing system may process selected monochromatic infrared images by using a ratio technique to generate an emissivity-independent thermal image of the scene. The tunable optical filter may also be used to adjust a quality factor and control an amount of radiated energy that is passed to an image sensor of the broadband imaging system thereby acting as an aperture to account for both low and high radiance portions of the scene.

One embodiment of the technology is a multi-spectral imaging pyrometer system that measures the radiated energy of a scene at selected discrete wavelengths in the 2 μm-10 μm range using a focal plane array-based imaging camera.

Another embodiment of the technology is an imaging system that utilizes a single, tunable optical filter and a broadband infrared imaging camera system to generate discrete images at a series of selected discrete wavelengths.

Another embodiment of the technology is to provide a multi-color pyrometer with true imaging capabilities that can generate emissivity corrected temperature data from each image pair.

Another embodiment of the technology is a tunable optical filter having a tuning capability, allowing it to actively change its center wavelength (CWL) and the bandwidth of it's full-width half maximum (FWHM) on the order of nanoseconds-milliseconds (GHz-MHz) tuning speed. The FWHM is related to the Q-factor (quality factor) of a resonator, which is a measure of the strength of the damping of its oscillations, or for the relative linewidth. The CWL tuning capability of the optical filter is used to create monochromatic infrared images at various wavelengths.

Another embodiment of the technology is to use a ratio technique to calculate emissivity-independent thermal image (radiomaetric) data of the scene according to a series of generated discrete monochromatic infrared images at selected discrete wavelengths.

Another embodiment of the technology is actively varying Q-factor of the tunable optical filter to control an amount of radiation reaching an image sensor to limit pixel saturation/underfilling, and expand the dynamic range of the temperature data in the image for a given pixel integration time, similar to that of visible HDR (High Dynamic Range) photograph.

Another embodiment of the technology is the use of a broadband infrared imaging device as a multiwavelength ratio pyrometer to calculate temperature using a ratio technique at specific wavelengths rather than using the same as a broadband imaging device and calculating temperature based on the integrated signal across the entire wavelength range of the detector.

These and other features, advantages, and objects of the present technology will be further understood and appreciated by those skilled in the art by reference to the following specification, claims, and appended drawings.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF EXEMPLARY EMBODIMENTS

For purposes of description herein, the terms "upper," "lower," "right," "left," "rear," "front," "vertical," "horizontal," and derivatives thereof shall relate to the technology as oriented in the corresponding figures. However, it is to be understood that the technology may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Aspects of the disclosed embodiments may be described in terms of functional block components and various processing steps. Such functional blocks may be realized by any number of components configured to perform the specified functions and achieve the various results. For example, the present technology may employ various optical imaging devices, filters, materials, and geometries, which may carry out a variety of operations. In addition, the technology described is merely one exemplary application for the disclosed device. Further, the present technology may employ any number of conventional techniques or methods of capturing, focusing, filtering, or manipulating any type of infrared image data received from a target image, scene, or field of view.

Methods and apparatus for a multi-spectral imaging system utilizing tunable optics according to various aspects of the present technology may operate in conjunction with any type of temperature-based measurement system such as an imaging pyrometer system. Various representative implementations of the present technology may be applied to any type of image capture device or infrared thermal imaging system for measuring one or more distinct wavelengths from a test object or target image.

The multi-spectral imaging system may be configured to measure the radiated energy of a target image (scene) at selected infrared wavelengths within a predetermined range, using a focal plane array type imaging sensor. The multi-spectral imaging system generates monochromatic infrared images at various discrete wavelengths and may then use a ratio technique to calculate emissivity-independent thermal image data of the scene according to the generated monochromatic infrared images at the selected wavelengths.

Figure 1:
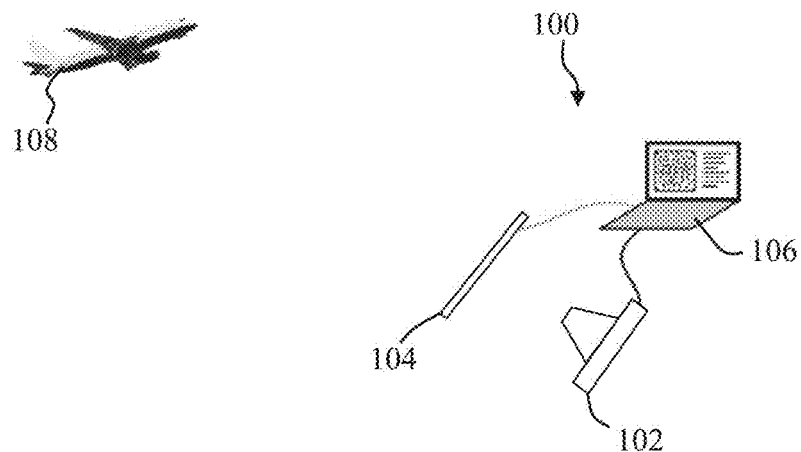
FIG. 1 representatively illustrates a multi-spectral imaging system in accordance with an exemplary embodiment of the present technology.

Referring now to FIG. 1, in one representative embodiment, a multi-spectral imaging system 100 may comprise an image capturing device 102 positioned to capture image data from a target image 108. A tunable optical filter 104 may be positioned between the target image 108 and an imaging sensor/detector of the image capturing device 102. An image processing system 106 may be coupled to the image capturing device 102 and the tunable optical filter 104. The image processing system 106 may be configured to control the tunable optical filter 104 to select two or more desired wavelengths. The image processing system 106 may also be configured to control the image capturing device 102 to capture image data at each of the selected wavelengths. The multi-spectral imaging system 100 may be further configured to measure radiated energy from the target image 108 at the two or more selected wavelengths within a range of about 2 μm- to about 10 μm to generate emissivity corrected temperature data for each image.

The image capturing device 102 may comprise any suitable system or device capable of collecting any suitable image data, such as radiated energy, within the focal plane of the image capturing device 102. For example, in one embodiment, the image capturing device 102 may comprise a broadband infrared camera configured to generate a two-dimensional thermographic scene from infrared radiation emitted from the target image 108. In one embodiment, infrared thermal energy between about 2 μm and about 10 μm is radiated from a complex, three-dimensional scene, and viewed by a conventional, quantum-detector based infrared imaging camera that is configured to generate image data.

The image capturing device 102 may comprise any suitable device and may be selected according to any desired criteria. For example, a quantum-detector based imaging device may provide benefits such as enhanced sensitivity, faster detector response time, and a high degree of optical resolution as compared to other types of imaging devices.

The image capturing device 102 may be allowed to operate in normal broadband mode during use. In this manner, the image capturing device 102 is not required to have any native filtering capabilities thereby allowing for a broader range of imaging devices to be used. The image capturing device 102 may also have any desired frame rate that is capable of meeting a desired test set up. For example, in one embodiment, the image capturing device 102 may have a frame rate of between about 1 kHz and about 30 kHz. In an alternative embodiment, the image capturing device 102 may be suited for higher speed operation and have a frame rate of up to about 200 kHz. It should be understood that these frame rates for the image capturing device 102 are merely examples and not intended to limit the frame rates of the image capturing device 102.

The tunable optical filter 104 allows the image capturing device 102 to be used in a conventional manner, with the detector operating in broadband mode, but function as a multi-color ratio pyrometer with true imaging capabilities. For example, the tunable optical filter 104 may comprise phase-change materials (PCM) and be positioned between the target image 108 and an imaging sensor of the image capturing device 102. The PCM may comprise any suitable material or materials (e.g., GeSbTe, GeSbSeTe, SbSe) and may selected according to any desired criteria. In an exemplary embodiment, the tunable optical filter 104 may have a PCM comprised of $Ge_2Sb_2Te_5$ arranged as a phase-change cavity embedded between distributed Bragg reflectors (DBRs) to enable spectrally-tunable (bi-stable) all solid-state FP-bandpass filters operating across a range of about 3 µm to about 5 µm. [See Table 1]. Other PCM materials may be selected to provide differing operating ranges.

TABLE 1

| λn Qm | CWL (µm) | FWHM (nm) 1 | Transmittance (%) | Phase-Change Materials (Amorphous/Crystalline) |
|---|---|---|---|---|
| λ1 Qmin | 3.46 | 100 | 85 | $Ge_2Sb_2Te_5$ (A) |
| λ1 Qmax | 3.46 | 500 | 85 | $Ge_2Sb_2Te_5$ (C) |
| λ2 Qmin | 4.00 | 100 | 85 | $Ge_2Sb_2Te_5$ (A) |
| λ2 Qmax | 4.00 | 500 | 85 | $Ge_2Sb_2Te_5$ (C) |

Figure 2:
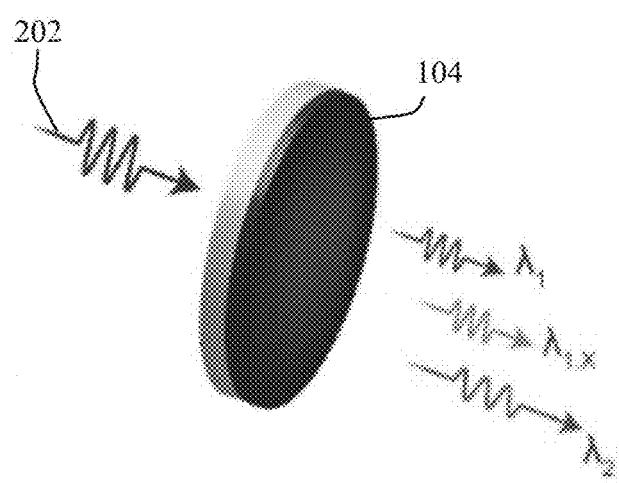
FIG. 2 representatively illustrates a tunable optical filter in accordance with an exemplary embodiment of the present technology.
Figure 3:
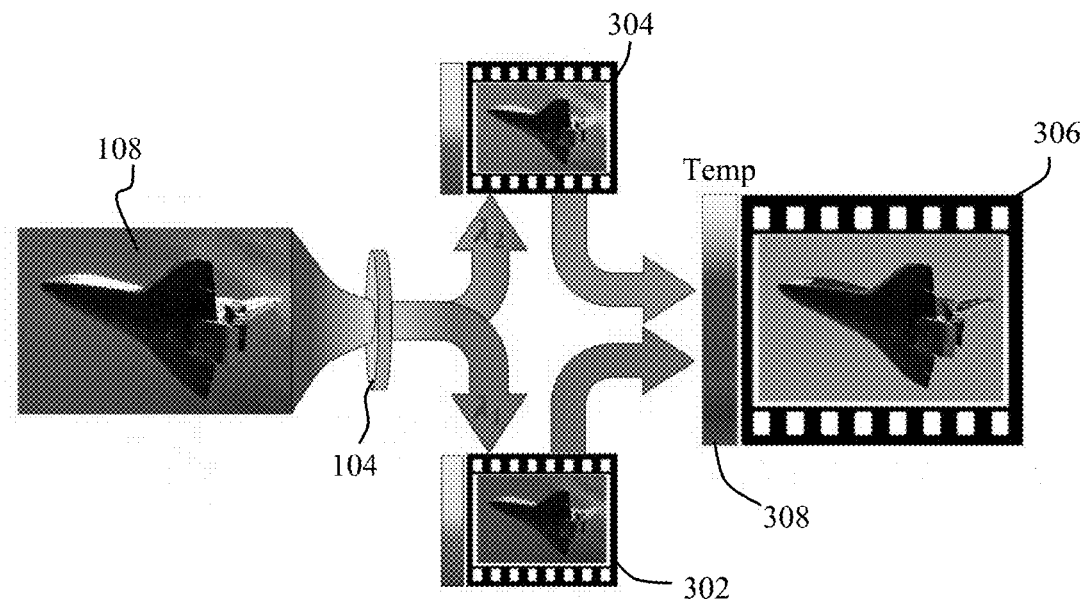
FIG. 3 representatively illustrates a flowchart for generating and combining discrete temperature images into a single image in accordance with an exemplary embodiment of the present technology.

Referring now to FIGS. 2 and 3, the tunable optical filter 104 may be configured to be selectively switched between user selected center-wavelengths $\lambda_1$, $\lambda_{1-x}$, $\lambda_2$, allowing the image capturing device 102 to collect a series of single-wavelength, monochromatic, two-dimensional images 302, 304. The tunable optical filter 104 may be switched between the selected center-wavelengths at a rate faster than the frame rate of the image capturing device 102 such that it is possible to take continuous images at the selected center-wavelengths as fast as the image capturing device 102 is able to generate them.

With particular reference to FIG. 3, at the pixel level, the intensity values of the monochromatic images 302, 304 represent the wavelength-dependent, blackbody energy emitted by the target image 108 due to its temperature. Ratioing the measured spectral irradiance for each wavelength $\lambda_1$, $\lambda_2$ yields emissivity-independent temperature data at each pixel. These discrete monochromatic images 302, 304 may then be combined by the imaging processing system 106 into a single combined temperature-based image 306 displaying the emissivity corrected temperature data for the target image 108. This combined image 306 displays temperature of the target image 108 that can be read along a temperature scale 308.

Figure 4:
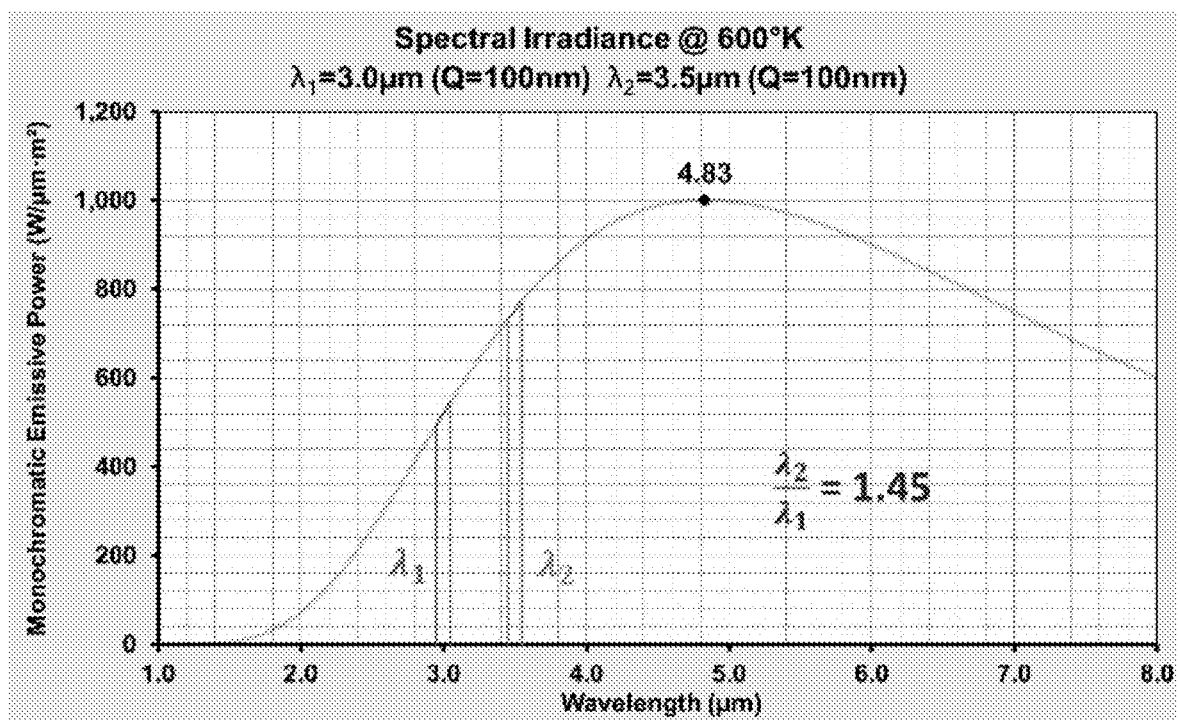
FIG. 4 representatively illustrates a blackbody spectral energy distribution in accordance with an exemplary embodiment of the present technology.
Figure 5:
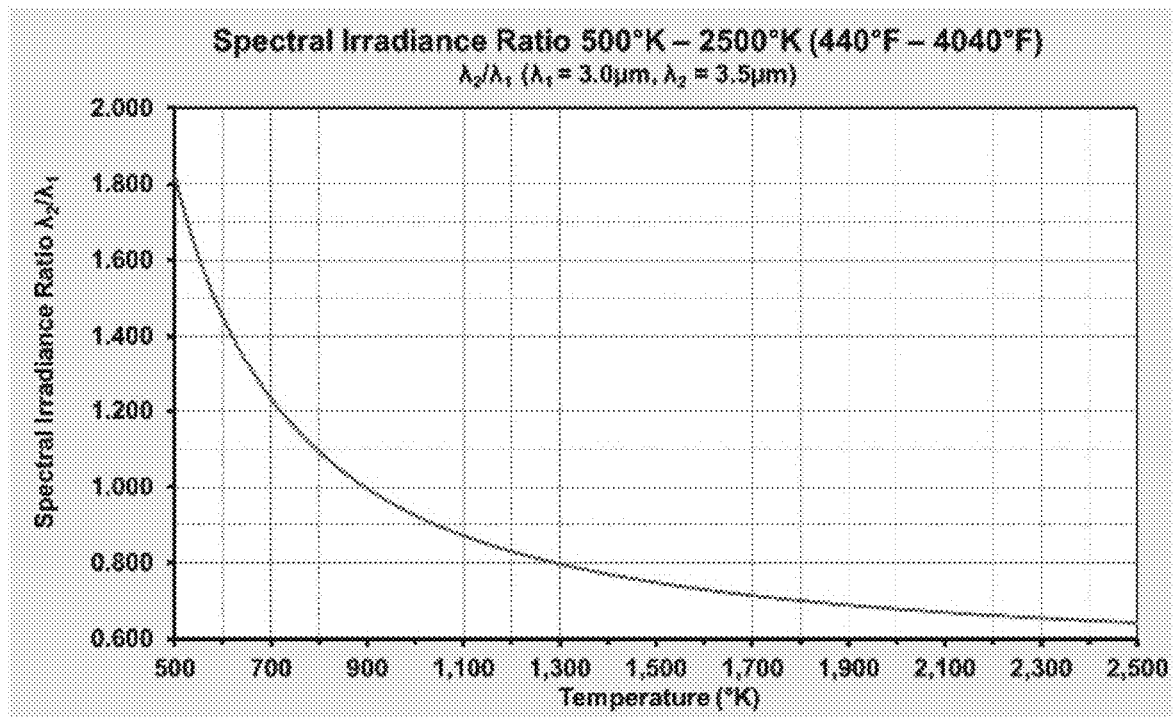
FIG. 5 representatively illustrates a spectral irradiance ratio in accordance with an exemplary embodiment of the present technology.

In operation, the spectral energy density distribution emitted by a body due to its temperature, as a function of wavelength, is given by Planck's Law [Eq. 1] and shown in FIG. 4 for a 600° K blackbody. The location of the radiation peak, as well as the spectral energy distribution predicted by Planck, is unique for each temperature. Since Planck's Law is well-behaved, $$E_\lambda = \frac{8\pi hc^2}{\lambda^5(e^{hc/\lambda kT} - 1)}\left[\frac{W}{m^2 \mu m}\right] \quad \text{[Eq. 1]}$$

and if the surface emittance remains constant at wavelengths $\lambda_1$, $\lambda_2$, it is possible to predict the temperature of an object by knowing the spectral energy at two wavelengths on this curve. In the example shown, the ratio between $\lambda_1$ and $\lambda_2$ is 1.45. Referring now to FIG. 5, plotting the spectral irradiance ratio $[\lambda_2/\lambda_1]$ over a wide temperature range illustrates the correlation between wavelength energy ratio vs temperature. Specifically, for each wavelength ratio (e.g., 1.45), there will be a unique temperature.

The PCM of the tunable optical filter 104 may exhibit a large reversible refractive index shift through an applied energetic stimulus. This allows for a rapidly tunable filter that may be selectively switched between one or more specified wavelengths. For example, in one embodiment, a PCM may be used as an "active" cavity in a Fabry-Perot filter. Through integration of the PCM, the tunable optical filter's 104 center wavelength (CWL) and Full Width Half Maximum (FWHM) may be actively tunable on the order of nanoseconds-microseconds (GHz-MHz), a rate which is generally faster than the frame rate of the image capturing device 102.

Changes in the CWL and/or FWHM are related to the quality factor (Q) of the filter. The Q of a resonator is a measure of the strength of the damping of its oscillations, or the width of the power spectral density of the electric field per unit wavelength/frequency. The tunable optical filter 104 is tunable because the CWL and FWHM tuning is a function of the refractive index of the cavity, which is a function of the PCM state (amorphous or crystalline). This behavior may be electronically controlled by the image processing system 106 and can be operated time-sequentially (e.g., nanosecond time scale), again, at a rate in excess that of the frame rate of the image capturing device 102.

The tunable optical filter 104 is configured to be dynamically tuned between two or more wavelengths with each state change. It is possible to vary the CWL of the tunable optical filter 104 to any value between the CWLs of the fully crystalline/fully amorphous states by varying the ratio of crystallinity/amorphicity of the filter medium. This flexibility is highly advantageous when the emissivity—which is a function of temperature and wavelength—is no longer well-behaved and changes significantly between $\lambda_1$, $\lambda_2$. A tuning range of the tunable optical filter 104 may be adapted to cover the visible to mid-wave infrared (MWIR) (600 nm-15 µm) spectrum, and the FWHM can range from less than about 1 nm to several µm, but is not limited, and is based on the transmittance range of the filter materials. For example, $Ge_2Sb_2Te_5$ is transparent between about 2 µm and about 10 µm, and $Ge_2Sb_2Se_xTe_{5-x}$ is transparent between about 800 nm and about 15 µm.

The combination of the tunable optical filter 104 with variable CWL and Q with a conventional quantum-based infrared image capturing device 102, allows the multi-spectral imaging system 100 to function as a tunable, multi-wavelength pyrometer with imaging capabilities. Tuning the tunable optical filter's 104 CWL and Q factor makes it possible to generate accurate temperature measurements, beyond the ability of currently available conventional IR imaging cameras and multiwavelength ratio pyrometers. The image processing system 106 may be configured to generate an accurate temperature measurement of the target image 108 using a two-wavelength, ratio technique. For example, the image processing system 106 may be configured to assume that an emissivity ($\varepsilon$) at each sampled wavelength $\lambda_1$, $\lambda_2$ remains constant $\varepsilon_{\lambda_1} = \varepsilon_{\lambda_2}$. Therefore, the ratioed emittance values $\varepsilon_{\lambda_2}/\varepsilon_{\lambda_1}$ will cancel, and will have no effect on the measured radiance. Emissivity is a function of temperature and wavelength, and the ability to dynamically vary $\lambda_1$, $\lambda_2$ gives the image processing system 106 greater flexibility over conventional pyrometric systems when $\varepsilon_{\lambda_2}/\varepsilon_{\lambda_1} \neq 1$, by allowing the image processing system 106 to select, either automatically or in response to a set of predetermined factors, alternate wavelengths which satisfy the constant emissivity requirement. Additionally, the PCM of the tunable optical filter 104 isn't limited to transitioning between only two wavelengths corresponding to its fully crystalline/fully amorphous states. The CWL can be tuned to any number (n) of intermediate wavelengths, $\lambda_1$, $\lambda_2$, $\lambda_3$, . . . $\lambda_n$ that exist between the fully crystalline/fully amorphous states. The number of possible states is limited only by the resolution of phase-change power supplied by the switching electronics.

This degree of instant tunability isn't possible with current pyrometric systems that rely on conventional, fixed CWL/Q factor optical components to make their measurements. Further, current radiometric infrared imaging systems use large diameter/low f-number (f/#), fixed aperture lenses to control the radiant flux reaching the image sensor. Higher calibrated temperature ranges are achieved not by limiting the radiation flux with higher f-number optics, but by reducing the integration time on the detector sensing elements. This limits the ability of conventional optics system to adequately function in all situations.

Figure 6:
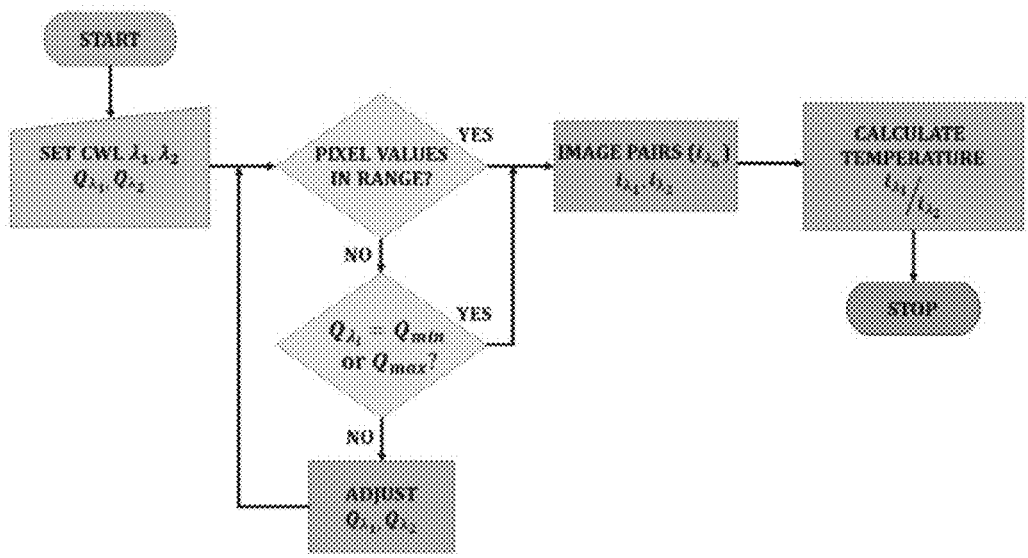
FIG. 6 representatively illustrates a flowchart for adjusting a Q factor in accordance with an exemplary embodiment of the present technology.

Contrary to conventional systems, embodiments of the disclosed multi-spectral imaging system 100 is also configured to limit the radiation flux by changing the Q factor of the tunable optical filter 104. The ability to vary the filter Q factor of the tunable optical filter 104 allows it to act as a solid-state adjustable aperture, effectively allowing the tunable optical filter 104 to selectively increase or decrease the amount of radiant energy that is passed to the image sensor to prevent pixel over/under saturation. For example, with reference now to FIG. 6, the image processing system 106 may be configured to adjust the Q factor of the tunable optical filter 104 for a set of desired pixel signal levels to create an image pair $[i_{\lambda_2}/i_{\lambda_1}]$ and calculate a global temperature. For portions of an image scene that are very bright (e.g., pixels that are not in a desired range), the Q factor may be made smaller to reduce the amount of energy that enters the image sensor of the image capturing device 102. Similarly, for portions of the image scene that are darker, the Q factor may be increased to allow more energy to enter the image sensor of the image capturing device 102. Once a suitable set of Q factors is determined, the image pairs may be generated and the temperature of the target image 108 calculated.

Figure 7A:
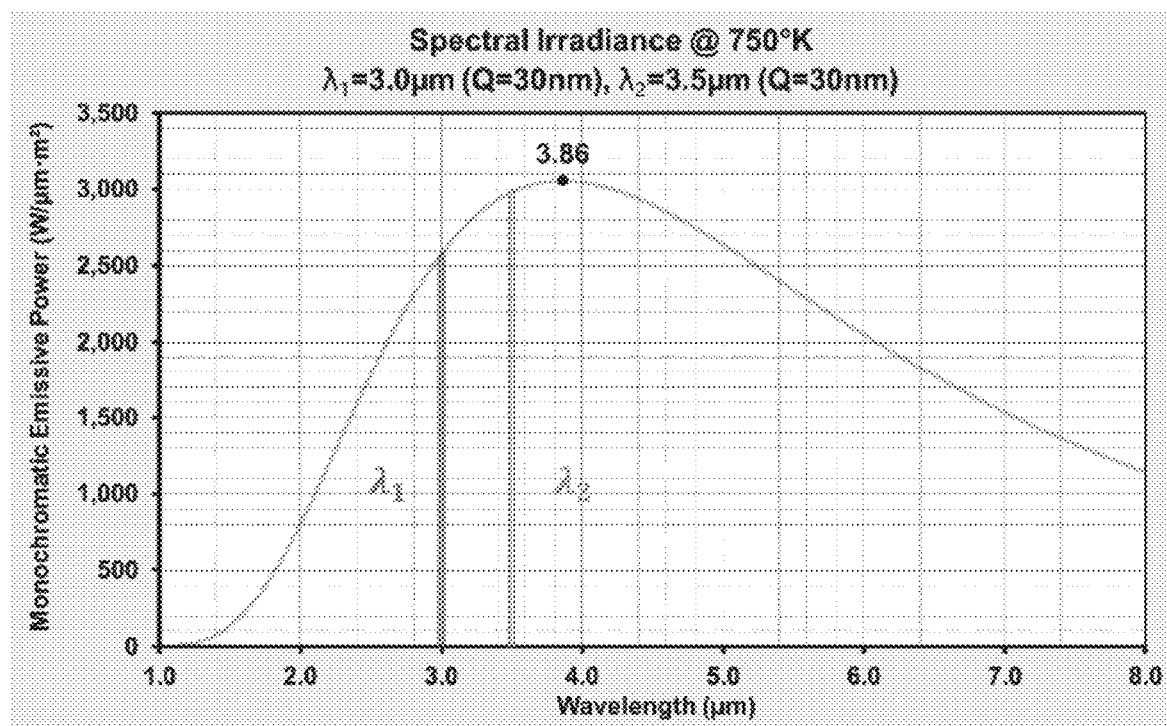
FIG. 7A representatively illustrates a spectral energy distribution for a high radiosity target image in accordance with an exemplary embodiment of the present technology.
Figure 7B:
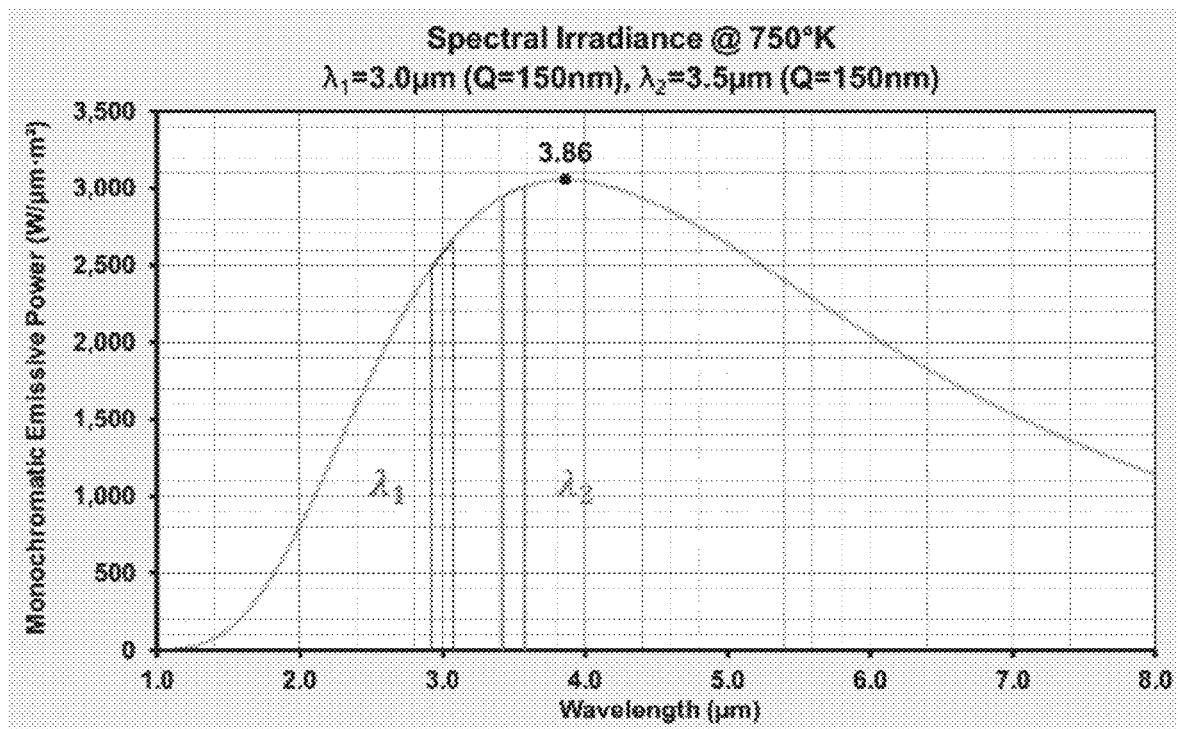
FIG. 7B representatively illustrates a spectral energy distribution for a low radiosity target image in accordance with an exemplary embodiment of the present technology.
Figure 8:
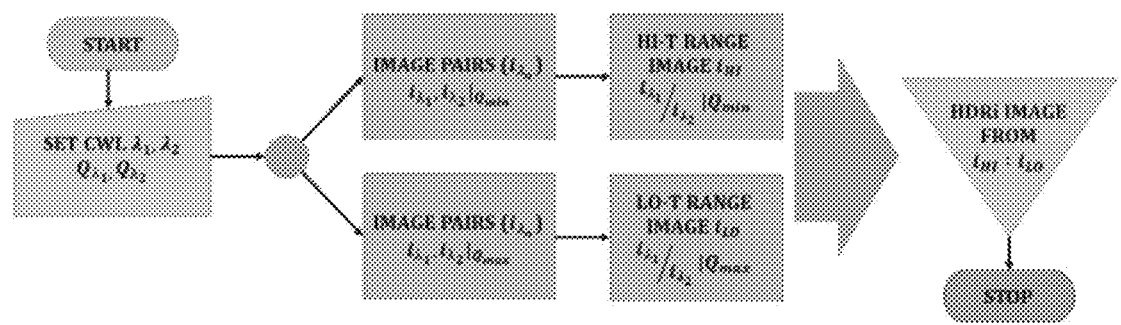
FIG. 8 representatively illustrates a flowchart for generating a high dynamic range image based on radiosity in accordance with an exemplary embodiment of the present technology.

Referring now to FIGS. 7A and 7B, using the tunability of the tunable optical filter's 104 Q factor, the image processing system 106 can create a composite radiometric image with an extended dynamic range from a series of images that were optimized using different Q factors. For example, the image processing system 106 may first create a series of image pairs $[i_{\lambda_2}/i_{\lambda_1}]$, each taken at different Q factors (Qmin=30 nm, Qmax=150 nm) and optimized for regions of the scene with high/low radiance respectively. Varying the Q factor increases or decreases the transmitted energy to the image sensor of the image capturing device 102, thereby enhancing an image for either high or low radiosity target images 108 without the need for an adjustable aperture on the multi-spectral imaging system 100. Referring now to FIG. 8, the image processing system 106 may be configured to combine these optimized images together to generate a composite image with an extended dynamic temperature range. This High Dynamic Range IR (HDRi) image would not be possible by using an image pair taken with a fixed Q factor because portions of the image scene would either be too dark or oversaturated to process correctly.

Figure 9:
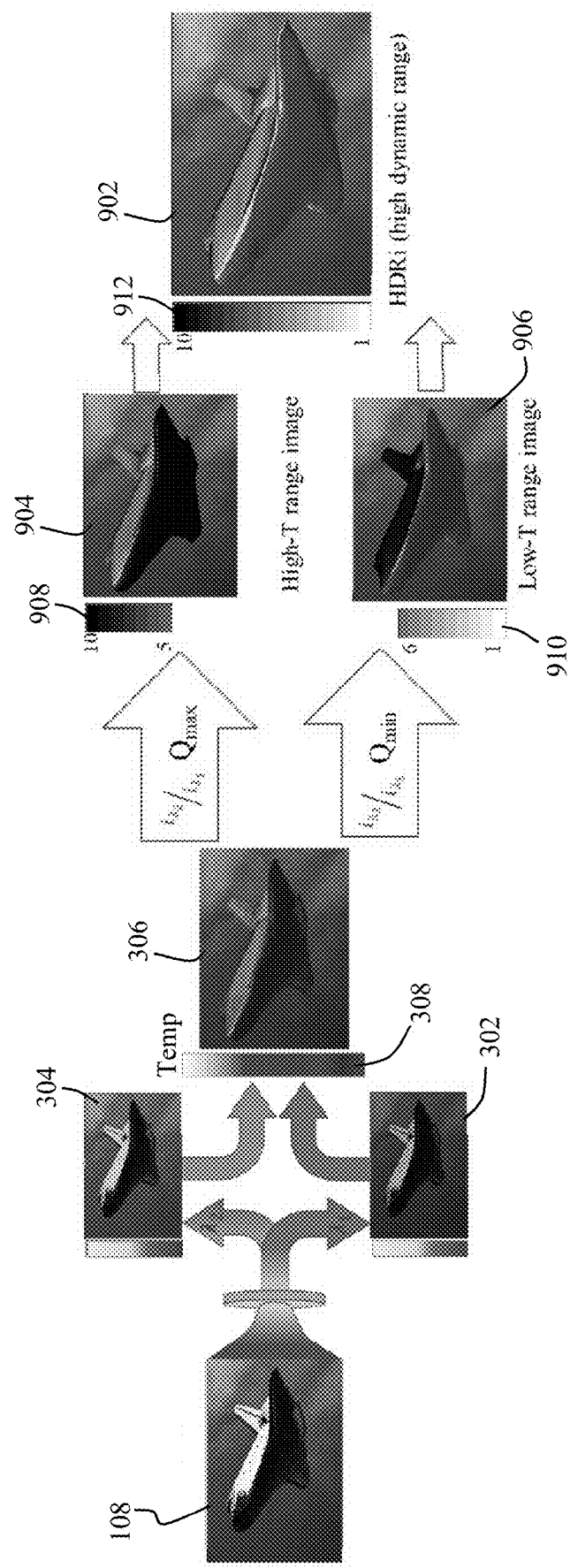
FIG. 9 representatively illustrates a flowchart for generating a high dynamic range image in accordance with an exemplary embodiment of the present technology.

Referring now to FIG. 9, the image processing system 106 may be configured to vary the Q factor for the combined temperature-based image 306 generated from the discrete wavelength images 302, 304 to account for high or low radiosity portions within the target image 108 and generate discrete images for $Q_{min}$ 906 and $Q_{max}$ 904 which can be combined to generate a final HDRi image 902 that accounts for not only high and low radiance portions of the target image 108 but also incorporates the emissivity corrected temperature data generated from each discrete wavelength. The generated image for $Q_{max}$ 904 may represent a high temperature range of the image representing a specified first range 908 of temperatures. The generated image for $Q_{min}$ 906 may represent a comparatively low temperature range of the image representing a specified second range 910 of temperatures that may have a small overlap with the first range 908 of temperatures. The image processing system 106 may then combine the discrete images for $Q_{min}$ 906 and $Q_{max}$ 904 into a single HDRi image 902 covering the entire temperature range 912 represented by the generate discrete images for $Q_{min}$ 906 and $Q_{max}$ 904.

These and other embodiments for methods of transmitting and filtering selected wavelengths of light may incorporate concepts, embodiments, and configurations as described above. The particular implementations shown and described are illustrative of the technology and its best mode and are not intended to otherwise limit the scope of the present technology in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the components and/or elements recited in any apparatus embodiment may be assembled or otherwise operationally configured in a variety of permutations to produce substantially the same result as the present technology and are accordingly not limited to the specific configuration recited in the specific examples.

As used herein, the terms "comprises," "comprising," or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same. Any terms of degree such as "substantially," "about," and "approximate" as used herein mean a reasonable amount of deviation of the modified term such that the end result is not significantly changed. For example, these terms can be construed as including a deviation of at least ±5% of the modified term if this deviation would not negate the meaning of the word it modifies.

The present technology has been described above with reference to exemplary embodiments. However, changes and modifications may be made to the exemplary embodiments without departing from the scope of the present technology. These and other changes or modifications are intended to be included within the scope of the present technology, as expressed in the following claims.

We claim:

1. A multi-spectral imaging system for measuring a temperature of a target image, comprising:
    a broadband image capturing device configured to capture image data from the target image;
    an image processing system coupled to the image capturing device and configured to receive the captured image data;
    a tunable optical filter configured to be positioned between the image capturing device and the target image and coupled to the image processing system, and having a tuning response time in excess of a frame rate of the broadband image capturing device, wherein the tunable optical filter is configured to:
        allow a first selected infrared wavelength to pass to the image capturing device in response to a first signal from the image processing system; and
        allow a second selected infrared wavelength to pass to the image capturing device in response to a second signal from the image processing system,
    wherein:
        the broadband image capturing device is configured to:
            generate a first monochromatic infrared image at the first selected infrared wavelength; and
            generate a second monochromatic infrared image at the second selected infrared wavelength; and
        the image processing system is configured to use a ratio technique to generate an emissivity-independent thermal image of the target image according to the generated first and second monochromatic infrared images at the first and second selected infrared wavelengths.

2. A multi-spectral imaging system for measuring a temperature of a target image according to claim 1, wherein the tunable optical filter comprises:
    a Fabry-Perot filter; and
    a phase change material (PCM) disposed within a cavity of the Fabry-Perot filter.

3. A multi-spectral imaging system for measuring a temperature of a target image according to claim 2, wherein the tunable optical filter alters the refractive index of the PCM in response to the first and second signals from the image processing system.

4. A multi-spectral imaging system for measuring a temperature of a target image according to claim 1, wherein the tunable optical filter is further configured to adjust a quality (Q) factor to limit radiation flux and selectively control an amount of radiant energy that is passed to the broadband image capturing device.

5. A multi-spectral imaging system for measuring a temperature of a target image according to claim 4, wherein:
    the tunable optical filter reduces the Q factor in response to a third signal from the image processing system when a high radiance target image is detected;
    the image capturing device generates a third image in response to the third signal;
    the tunable optical filter increases the Q factor in response to a fourth signal from the image processing system when a low radiance target image is detected;
    the image capturing device generates a fourth image in response to the fourth signal; and
    the image processing system combines the third and fourth images to generate a composite image with an extended dynamic temperature range.

6. A multi-spectral imaging system for measuring a temperature of a target image according to claim 5, wherein the image processing system is configured to combine the composite image and the emissivity-independent thermal image to generate a final high dynamic range IR image.

7. A multi-spectral imaging system for measuring a temperature of a target image according to claim 1, wherein the broadband image capturing device comprises a quantum-detector based imaging device.

8. A multi-spectral imaging system for measuring a temperature of a target image according to claim 1, wherein the ratio technique comprises:
    determining a ratio between the first and second selected infrared wavelengths according to a spectral energy at each wavelength; and
    determining a temperature according to the determined ratio along to a spectral irradiance plot.

9. A multi-spectral imaging system for measuring a temperature of a target image, comprising:
    a broadband image capturing device configured to capture image data from the target image;
    an image processing system coupled to the image capturing device and configured to receive the captured image data;
    a tunable optical filter positioned between the image capturing device and the target image and coupled to the image processing system, wherein the tunable optical filter is configured to:
        allow a first infrared wavelength to pass to the image capturing device in response to a first signal from the image processing system; and
        allow a second different infrared wavelength to pass to the image capturing device in response to a second signal from the image processing system
        reduce a quality (Q) factor in response to receiving a third signal from the image processing system when a high radiance target image is detected; and
        increase the Q factor in response to a fourth signal from the image processing system when a low radiance target image is detected,
    wherein the image processing system is configured to:
        cause the broadband image capturing device to generate a monochromatic infrared image at each of the first and second selected wavelengths; and
        generate an emissivity-independent thermal image of the target image according to the generated monochromatic infrared images at the first and second selected wavelengths generate a high radiance image in response to the third signal;

generate a low radiance image in response to the fourth signal; and combining the high and low radiance images to generate a composite image with an extended dynamic temperature range.

10. A multi-spectral imaging system for measuring a temperature of a target image according to claim 9, wherein the image processing system is configured to combine the composite image and the emissivity-independent thermal image to generate a final high dynamic range IR image.

11. A multi-spectral imaging system for measuring a temperature of a target image according to claim 9, wherein image processing system is configured to use a ratio technique to generate an emissivity-independent thermal image the ratio technique comprising:

determining a ratio between the first and second selected infrared wavelengths according to a spectral energy at each wavelength; and determining a temperature according to the determined ratio along to a spectral irradiance plot.

12. A method of calculating emissivity-independent thermal image data of a target image, comprising:

positioning a broadband image capturing device to capture image data from the target image;

coupling an image processing system to the image capturing device to receive the captured image data;

positioning a tunable optical filter between the image capturing device and the target image, wherein the tunable optical filter is coupled to the image processing system;

passing a first selected infrared wavelength through the tunable optical filter to the image capturing device in response to a first signal from the image processing system;

generating a first monochromatic infrared image with the broadband image capturing device at the first selected infrared wavelength;

passing a second selected infrared wavelength through the tunable optical filter to the image capturing device in response to a second signal from the image processing system;

generating a second monochromatic infrared image with the broadband image capturing device at the second selected infrared wavelength;

generating an emissivity-independent thermal image of the target image with the image processing system according to the generated first and second monochromatic infrared images at the first and second selected infrared wavelengths; and adjusting a quality (Q) factor of the tunable optical filter to limit radiation flux and selectively control an amount of radiant energy that is passed to the broadband image capturing device.

13. A method of calculating emissivity-independent thermal image data of a target image according to claim 12, wherein the processing system is configured to use a ratio technique to process the generated first and second monochromatic infrared images.

14. A method of calculating emissivity-independent thermal image data of a target image according to claim 13, wherein the ratio technique comprises:

determining a ratio between the first and second selected infrared wavelengths according to a spectral energy at each wavelength; and determining a temperature according to the determined ratio along to a spectral irradiance plot.

15. A method of calculating emissivity-independent thermal image data of a target image according to claim 12, wherein:

the tunable optical filter reduces the Q factor in response to a third signal from the image processing system when a high radiance target image is detected;

the image capturing device generates a third image in response to the third signal;

the tunable optical filter increases the Q factor in response to a fourth signal from the image processing system when a low radiance target image is detected;

the image capturing device generates a fourth image in response to the fourth signal; and the image processing system combines the third and fourth images to generate a composite image with an extended dynamic temperature range.

16. A method of calculating emissivity-independent thermal image data of a target image according to claim 15, further comprising combining the composite image and the emissivity-independent thermal image to generate a final high dynamic range IR image.

17. A method of calculating emissivity-independent thermal image data of a target image according to claim 12, wherein:

the tunable optical filter comprises a Fabry-Perot filter having a phase change material (PCM) disposed within a cavity of the Fabry-Perot filter; and the tunable optical filter alters the refractive index of the PCM in response to a signal from the image processing system.

* * * * *